(12) United States Patent
Boldt, Jr. et al.

(10) Patent No.: US 7,170,480 B2
(45) Date of Patent: *Jan. 30, 2007

(54) VIDEO DISPLAY APPARATUS

(75) Inventors: Norton K. Boldt, Jr., Lake Forest, CA (US); Curt K. Deckert, Santa Ana, CA (US)

(73) Assignee: Visioneered Image Systems, Inc., Garden Grove, CA (US)

(*) Notice: Subject to any disclaimer, the term of this patent is extended or adjusted under 35 U.S.C. 154(b) by 486 days.

This patent is subject to a terminal disclaimer.

(21) Appl. No.: 10/705,515

(22) Filed: Nov. 10, 2003

(65) Prior Publication Data

US 2004/0104871 A1 Jun. 3, 2004

Related U.S. Application Data

(63) Continuation-in-part of application No. 09/703,916, filed on Nov. 1, 2000, now Pat. No. 6,657,605.

(51) Int. Cl.
G09G 3/36 (2006.01)

(52) U.S. Cl. .......................... 345/83; 345/87; 345/89; 345/84

(58) Field of Classification Search ................ 345/83, 345/87, 89, 64, 39, 44, 48, 8, 84; 349/5, 349/62, 201; 359/212, 630, 565, 745, 15; 365/106; 362/244; 348/770, 771; 353/30
See application file for complete search history.

(56) References Cited

U.S. PATENT DOCUMENTS

| | | | | |
|---|---|---|---|---|
| 4,842,396 A | * | 6/1989 | Minoura et al. ............ 359/212 |
| 5,436,763 A | * | 7/1995 | Chen et al. .................. 359/565 |
| 5,589,982 A | * | 12/1996 | Faklis et al. ................. 359/565 |
| 5,822,091 A | * | 10/1998 | Baker ........................... 359/10 |
| 5,864,430 A | * | 1/1999 | Dickey et al. ............... 359/559 |
| 5,889,567 A | * | 3/1999 | Swanson et al. .............. 349/62 |
| 5,926,411 A | * | 7/1999 | Russell ........................ 365/106 |
| 5,980,454 A | * | 11/1999 | Broome ....................... 600/176 |
| 6,008,939 A | * | 12/1999 | Hebert ......................... 359/475 |
| 6,115,152 A | * | 9/2000 | Popovich et al. ............. 359/15 |
| 6,720,519 B2 | * | 4/2004 | Liu et al. ............... 219/121.61 |
| 6,791,760 B2 | * | 9/2004 | Janeczko et al. ............ 359/630 |
| 2002/0036904 A1 | * | 3/2002 | Kawashima et al. ......... 362/276 |
| 2002/0126479 A1 | * | 9/2002 | Zhai et al. ................... 362/244 |
| 2004/0108971 A1 | * | 6/2004 | Waldern et al. ................. 345/8 |

* cited by examiner

*Primary Examiner*—Bipin Shalwala
*Assistant Examiner*—Prabodh Dharia
(74) *Attorney, Agent, or Firm*—Harold L. Jackson (57) ABSTRACT

A color video display apparatus comprises a pixel array with each pixel containing one or more LEDs for generating each of the selected colors and a diffractive optical element positioned in front of the array to form the transmitted light into a substantially elliptical pattern. Improved uniformity for the apparatus is achieved by measuring the intensity of each separate color generating LED in each pixel, recording each intensity and varying the current to each separate color LED or LEDs so that every LED or LEDs responsible for each color to provide a suitable color output. A feature of the apparatus is that a number of separate modules, each having a pixel array, can be combined to construct a video image board. These boards have applications in such areas as billboards along roadways and as signs in stadiums.

23 Claims, 10 Drawing Sheets

VIDEO DISPLAY APPARATUS

RELATED APPLICATION

This application is a continuation-in-part application of application Ser. No. 09/703,916, filed Nov. 01, 2000 entitled VIDEO DISPLAY APPARATUS, now U.S. Pat. No. 6,657,605.

BACKGROUND OF THE INVENTION

1. Field of the Invention

This invention relates to an LED video display apparatus and method of operating the same and more particularly to such and apparatus with an increased wide angle viewing area and a method of normalizing the output to an individual color LED or LEDs.

2. Description of the Prior Art

Large signs and billboards have been in wide use for many years as a medium for advertising and for imparting information to the public. Traditionally, signs and billboards have been used to exhibit a single advertising theme, product, or message. Due to the fixed print nature of this medium, it did not lend itself to displaying a larger series of ideas as would be common with a medium such as television.

Within the last several decades, this has changed. The advances of technology in such areas as light emitting sources, and in particular light emitting diodes (LEDs), has made it possible to provide a series of messages to signs and billboards. As a result, a wide variation of words and images can be projected in a variety of ways from the same sign to advertise and inform the public.

For example, during sporting events animated signs can heighten a fan's involvement in the game with slogans and images. Also, advertisers can get the attention of viewers to encourage purchasing products ranging from such things as a specific beverage, to items that may not be available at the game. The fixed print surface portion of billboards can be replaced with multiple light sources that can exhibit multiple advertisers and messages to passing motorists. Applying LEDs to this medium has increased the effectiveness of the presentation and has captured public notice.

LED Video/Graphic Boards, as they are commonly known, have been in production and use throughout Asia for nearly ten years. Color LEDs are arranged in pixels and the pixels form an array. Various numbers of arrays can be combined to produce a display apparatus. Such a display have uses in applications such as billboards and signs.

Only within the last five years has it become economically feasible to produce Large-Area Full-Color Video/Graphic Boards. These units have appeared in such places as Times Square, Las Vegas, Rock Concerts, Theme Parks, and Trade shows. However, the current use of LEDs for these purposes has significant drawbacks.

Initially LEDs suffered from substantial technical limitations. They proved expensive, had low power output, produced a substantial amount of heat, as a by-product, in operation and due to the accompanying electronic circuitry, exhibited poor reliability in sign and billboard applications. Also such LEDs did not provide good resolution or contrast. Improvements over the last several years have resulted in lower cost for certain types of LEDs while exhibiting higher power output and increased reliability. This, along with advances in electronic power circuitry, allowing for lower heat loss, has resulted in increased use of LEDs in billboard and sign applications. However, a major problem still remains in that the displays do not provide a very good level of contrast or resolution and viewability from a variety of viewing angles.

The typical LED radiates light in substantially a circular cross sectional pattern or in a conical three-dimensional volume. Usually the greatest power distribution of the light is directly in front of the LED and the power drops off dramatically at the edges of the LED radiating cone. Usually this variation in power over viewing angle is characterized as a normal or Gaussian distribution depending on the effective focal length of the integral LED collecting lens. If a viewer moves from directly in front of the LED, there is a substantial amount of light that is not directed toward the viewer. As the viewer moves to the side of the LED, the viewer receives substantially less light. Not only is this inefficient, allowing for a very limited optimal viewing point, but the wasted light can interfere with the contrast of other LEDs in a display system. One way to overcome this problem is to use an LED that can produce light in a fixed pattern that has a more useful distribution of power over a wide angle.

The Nichia Corporation produces a "super oval" LED that distributes its light more evenly over a wider horizontal viewing plane, i.e. over a range of approximately −50 degrees from the center and +50 degrees from the center across the horizontal plane. However, between 50 and 90 degrees on both sides of the zero point of the plane the luminosity decreases in nearly an exponential fashion. This translates into a viewing range that is better than a standard LED system, but provides a harsh transition for the viewer beyond approximately 50 degrees from the center of radiation in both directions. Furthermore, the super oval LED accomplishes distributing the light by building into the LED a special optical element. Such a process naturally increases the cost of the LED. Finally, since the super oval type LED has the collecting lens cast within the LED as well as a reflector, the lens and reflector cannot be removed and changed if conditions so warrant.

A characteristic of super oval type LEDs is that the form of the output beam is not well controlled. When dispersion occurs along the horizontal axis there is a dispersive effect on the vertical axis. Thus, a dispersion in the horizontal makes for a dispersion in the vertical whether or not a vertical dispersion is desired.

A further problem with existing apparatus is that the power projected by an individual LED, pixel, and pixel array apparatus may vary. This is due to the variable output of individual LEDs which may not be consistent due to manufacturing and quality processes. Such problems leads to what is known as "tiling." This is where the brighter apparatus, an array or groups, i.e. of pixels, of a display stand out over the rest of the display. Tiling detracts from the quality of the display and can be an annoyance to a viewer.

What is needed is a color apparatus that can deliver a greater useful viewing angle, have better resolution and contrast, have better uniformity to reduce the possibility of tiling, have the capability to uniformly change the divergence of the light, and that utilizes less expensive LEDs.

SUMMARY OF THE INVENTION

The invention is directed to a video display apparatus that is combined to make up a signboard or display. The apparatus has a housing with a planar surface, and a number of pixels arranged in a plane parallel to the housing surface. Each pixel contains a number of LEDs with one or more LEDs in each pixel generating light in a selected color. The LEDs are aligned such that each LED projects light in a direction generally outwardly from the pixel. A diffractive optical element receives the light from the LEDs and projects it into a desired pattern.

In an X, Y, Z, coordinate system, the X and Y axis form the XY plane. It is the XY plane that contains the cross section of the pattern of the light. The Z axis is in the direction of propagation of the light from the diffractive optical element and is at the center of the cross section of the pattern in the XY plane. The Z axis is perpendicular to the XY plane. The light from the LEDs is emitted from the pixels toward the surface of the housing at a variety of angles. This is referred to as emitting light outwardly from the housing. The light is incident upon a diffractive optical element where the diffractive optical element, having, for example, holographic, kinoform, binary or multi-level surfaces, is designed to disperse incident light from the LEDs light in an elliptical pattern that may be symmetrical about the X axis and Y axis. Another case is where the Z axis is substantially perpendicular to the surface of the housing.

The cross section of the transmitted light, from the LED or pixel through the diffractive optical element is symmetrical about the X axis and Y axis and is greater in the X direction than the Y direction. The diffractive optical element can disperse as well as redirect the light. Light is considered redirected when the difference between the angle between the perpendicular to the surface of the housing and the Z axis is greater than 3 degrees.

Additional optical elements can be used in conjunction with the diffractive optical element. The additional elements do not need to be diffractive in nature. One such element can be a prismatic sheet that can be used to change the direction of the Z axis of the light dispersed by the diffractive optical element.

A reflector can be optionally used to direct light that is not transmitted along the axial line of the LED in a direction more in line with the axial line and outward from the pixel. Each pixel has a number of LEDs. One or more LEDs operate to supply a particular color, which may, but need not, be a primary color. The number of LEDs and the range of colors are factors that can vary depending upon such factors as customer demand. For example, a pixel could be composed of at least one green, blue and red LED. A number of pixel arrays can be combined to form a video image board. The number of pixel arrays that can be combined horizontally and vertically can vary. An LED designed to generate light at a specific color is a color specific LED.

Different diffractive optical elements can be interchanged in a video display apparatus. The diffractive optical elements can be used to form a variety of light output shapes including variations of an ellipse.

This is referred to as being in a substantially elliptical pattern where the light pattern is greater along the X axis than the Y axis.

A method for characterizing the output of a video display apparatus in accordance with the invention begins with applying power in pulses, preferably in the form of current at a selected voltage during a predetermined operating time, to the LED or LEDs responsible for a selected color in each pixel. The light output of the LED or LEDs is then measured and recorded. This procedure is repeated for each color responsible LED or LEDs in each pixel. After the light output from each color LED or LEDs is measured and recorded, then the operating time, or pulses of power, of each color LED or LEDs is varied to achieve a desired uniform output for the apparatus. This is referred to as normalizing the apparatus to create uniformity of colors and intensities in the apparatus.

A further step can be introduced such that the initial measured output for each LED is checked to determine if the output is below an acceptable level and if so, the LED apparatus is removed for replacement.

DETAILED DESCRIPTION OF THE DRAWINGS

The present invention may best be understood by reference to the following description taken in conjunction with the accompanying drawings, graphs, and flowcharts.

Figure 1:
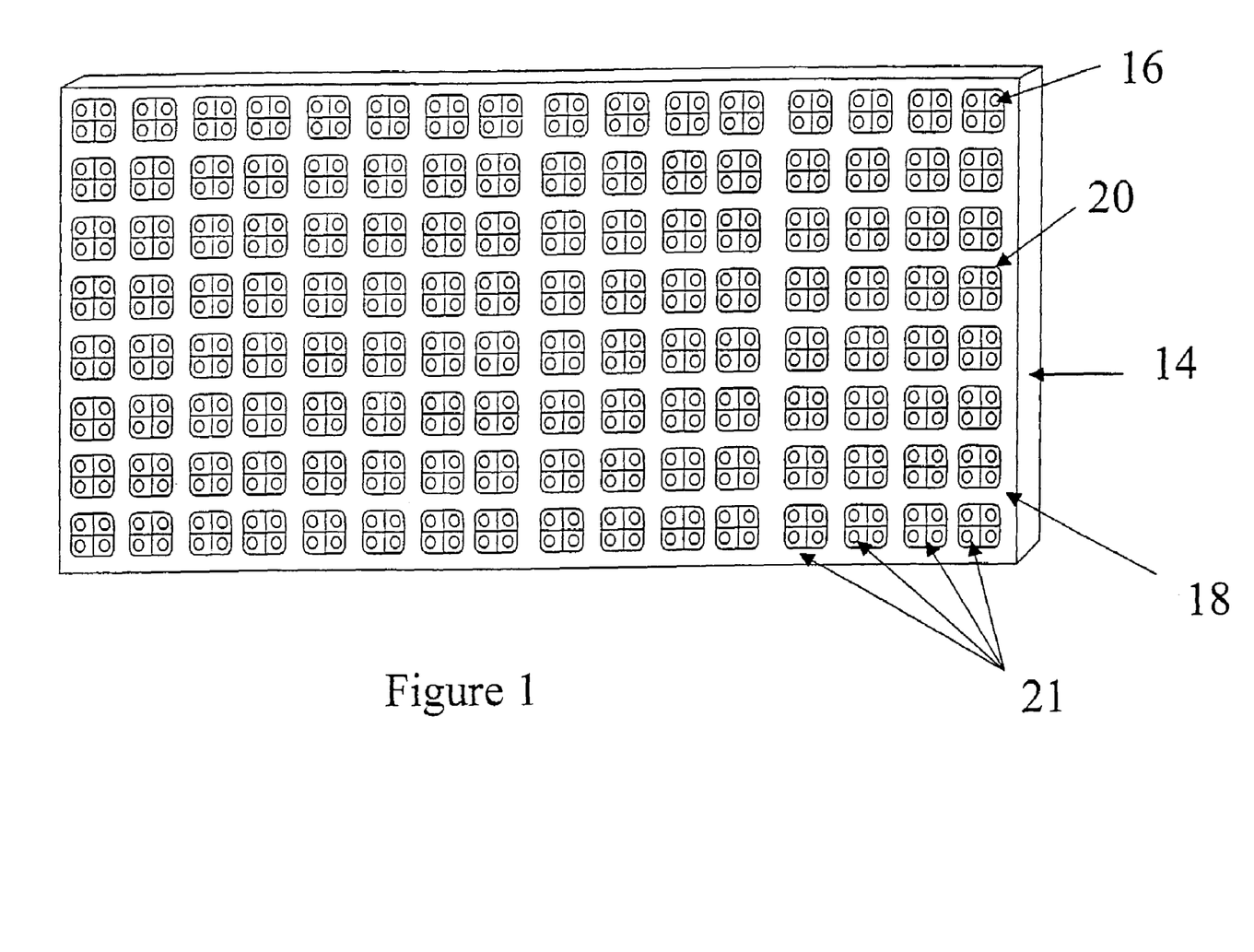
FIG. 1 is a front view of the housing of the video display apparatus without the mask or diffractive optical element displaying the position of the individual pixels and LEDs.
Figure 2:
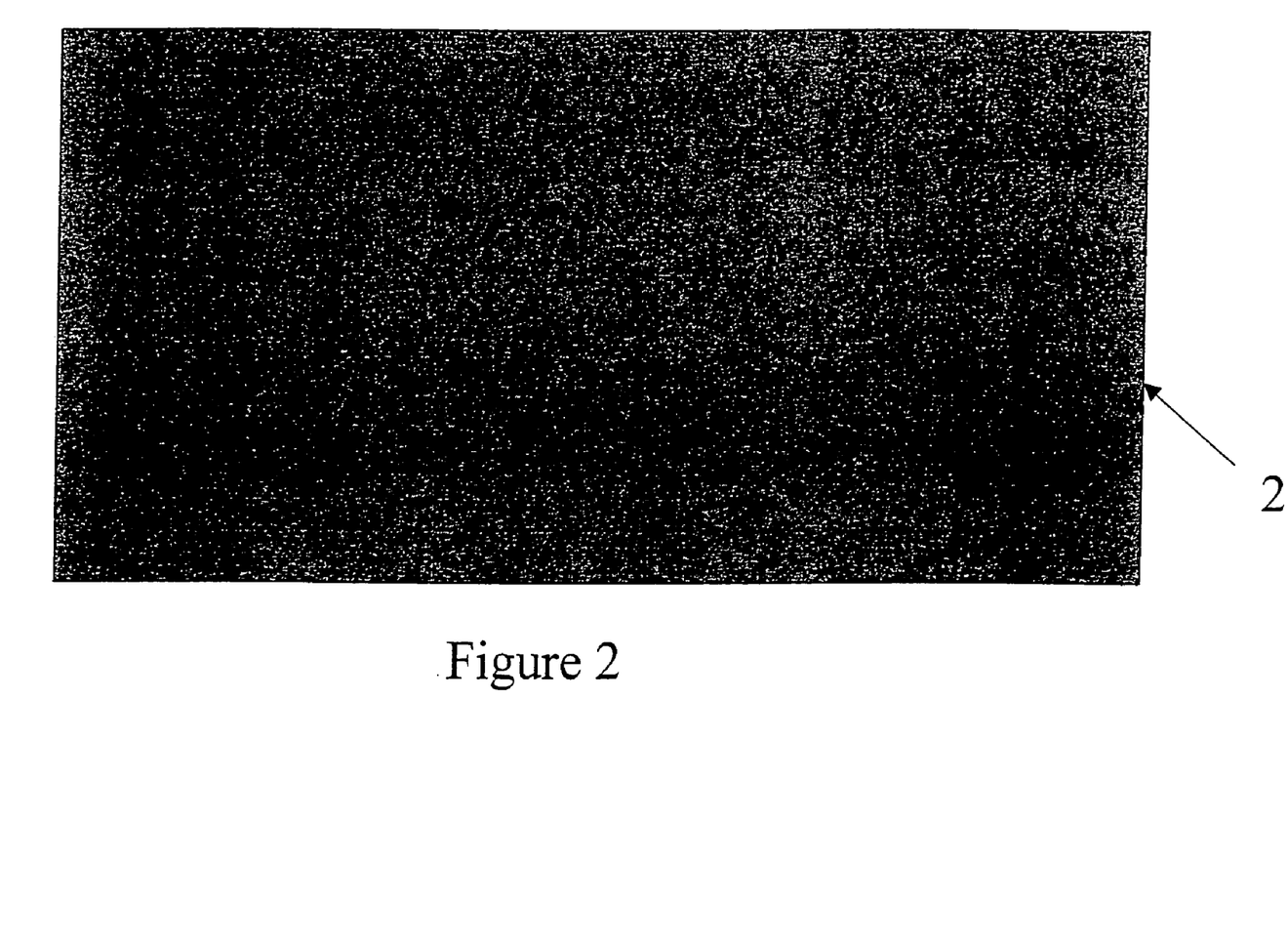
FIG. 2 is a front view of the diffractive optical element.

FIG. 1 illustrates the housing 14 of the video display apparatus and shows the relative positioning of the LEDs 16, pixels 20 a planar surface 18 of the housing 14 in relation to the apparatus. FIG. 2 shows the diffractive optical element 2 that fits over the pixel array 21 and is secured to the housing by a mask 3 shown in FIG. 3. A diffractive optical element functions on the diffraction principle, i.e., causes light to spread after a wavefront of light passes an opaque edge. See the Glossary at page 542 in the text "Optical system Design" by Robert Fisher and Biljana Tadic-Galeb, published by McGraw Hill. Such an optical element can employ, for example, holographic, kinoform, binary, multi-layer or continuous profile (grey scale) surfaces which rely on diffraction to control wavefronts. (The diffractive optical element may also serve to homogenize (make the transmitted light more uniform) and/or diffuse the light. See the MEMS Optical Inc. website www.memsoptical.com ("Diffractive Optics, are a broad class of optical components which rely on diffraction as opposed to refraction to modify how light propagates." MEMS states it can fabricate diffractive optics several ways—binary, multi-level, continuous profile (grey scale) and holographically as well as diffusers/homogenizers.

Also see the website for Hololight Consultancy www.hololight.virtualave.net. "A diffractive optical element is a new class of optics that operates on the principle of diffraction. Traditional optical elements use their shape to bend light. Diffractive optics work by breaking up incoming waves of light into a large number of waves, which recombine to form completely new waves. Diffractive optical elements are destined to re-define the role of optics in several areas."

Also see INO's website www.ino.qc.ca. which offers binary, multi-level, high frequency, continuous surface relief and volume diffractive elements. Such elements can function as diffusers and beam shapers among other purposes.

One such optical element can be in the form of a surface relief hologram, or other form of diffractive surface. The diffractive optical element functions, for example, to disperse the incident light to produce a transmitted light beam of a specific pattern such as a divergent beam having a generally elliptical shaped cross-section where the pattern in the X axis is greater than in the Y axis. Such an elliptical shape is referred to as having a substantially elliptical light output pattern.

Figure 3:
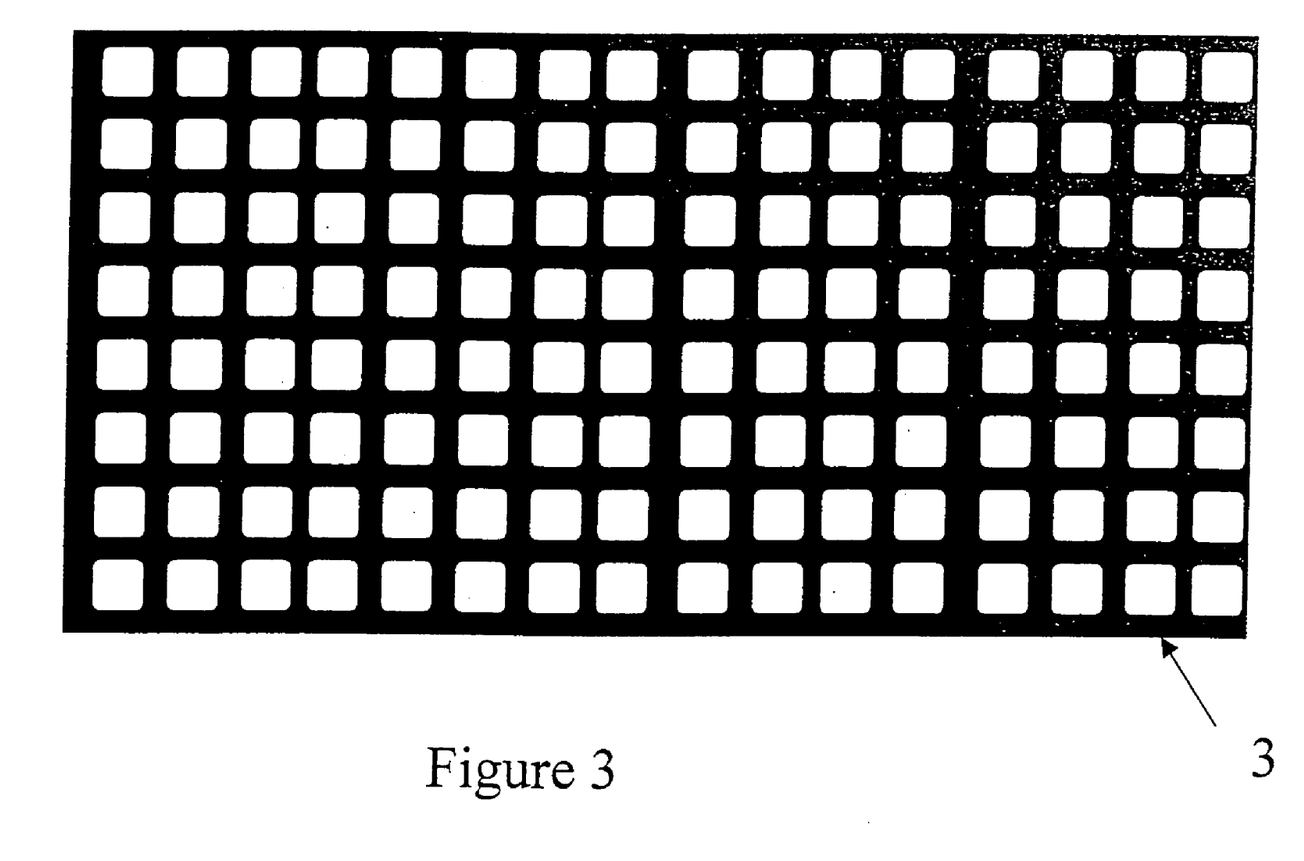
FIG. 3 is a front view of the mask.
Figure 4:
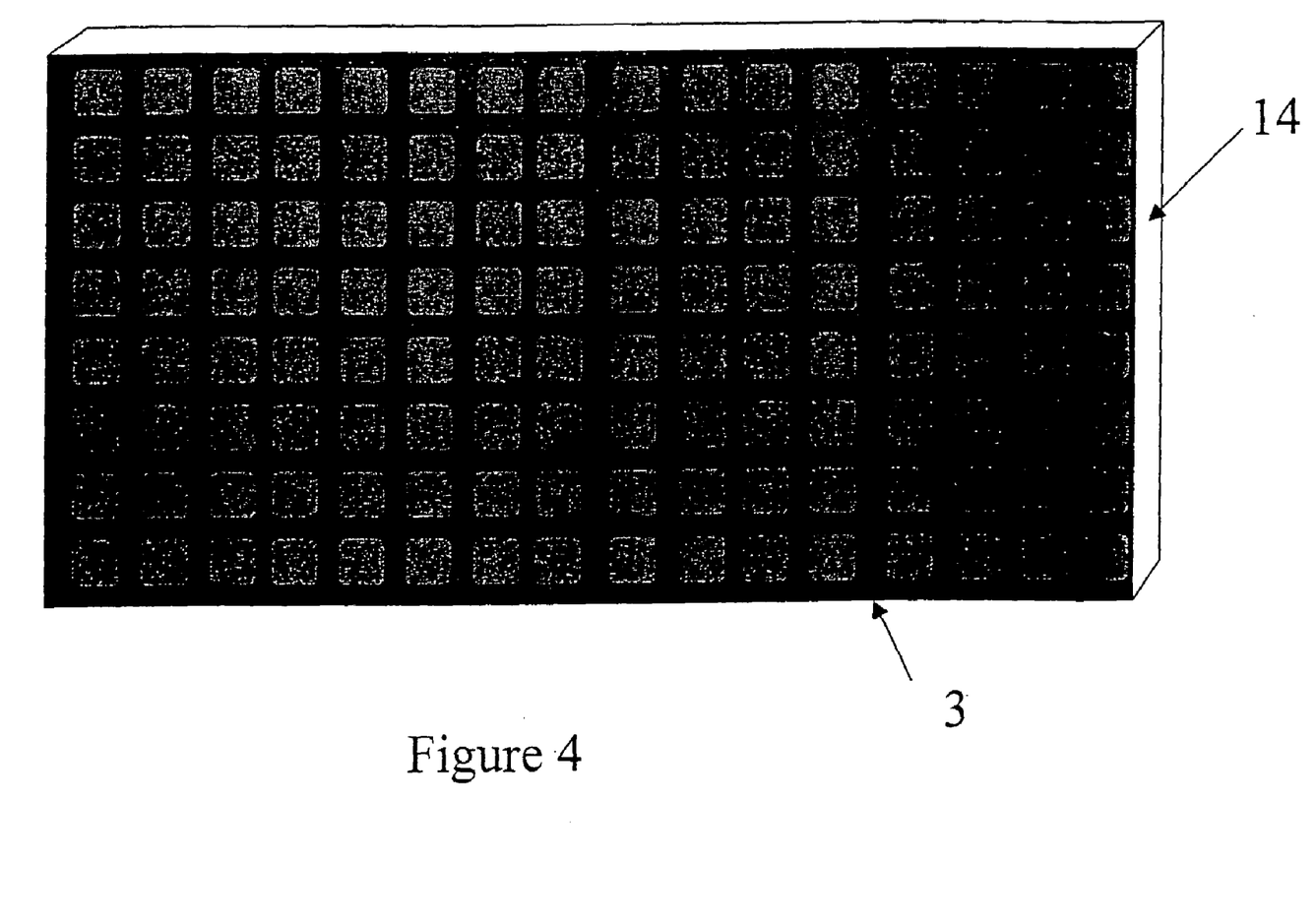
FIG. 4 is a front view of the assembled video display apparatus.

FIG. 3 is illustrative of the mask 3. The mask is colored black to improve the contrast of the display and to reduce the transmission of light from pixels due to light piping, i.e. where light is transmitted horizontally within the diffractive optical element. The diffractive optical element 2 fits between the mask 3 and the housing 14 of the apparatus as illustrated in FIG. 4. The mask secures the diffractive optical element 10 to the housing by suitable means such as screws (not shown).

Figure 5:
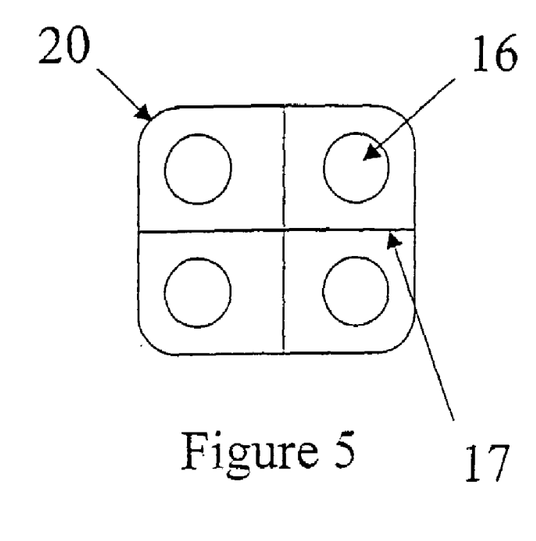
FIG. 5 is a front view of a pixel displaying four LEDs and associated reflectors.

One of the pixels, which makes up the array 21 of FIG. 1 is shown in FIG. 5. In this figure, four LEDs 16 compose a pixel. Each LED 16 emits a specific color of light. One green, one blue, and two red emitters are shown, however the number of LEDs and the distribution of colors is not restricted to those just mentioned. It is only necessary that each pixel contain color specific LEDs. Each LED has a reflector 17 for directing a portion of the light that is not along the LED axis, as identified in FIG. 6, of the LED toward the surface of the pixel. Light that is emitted along the general line at the surface of the diffractive optical element is identified by the line marked A in FIG. 6 and is the Z axis. A pixel is the smallest element of an image that is displayed. In the context of this invention, the pixel must have the ability to exhibit color that may include a range of required colors for that smallest element of the image to be displayed. Thus, the pixel may be comprised of a number of LEDs to make up the required colors.

The LEDs transmit light in a substantially outward or normal direction of the pixel onto the diffractive optical element 2 which then retransmits the light having substantially the cross-section of an ellipse.

Figure 6:
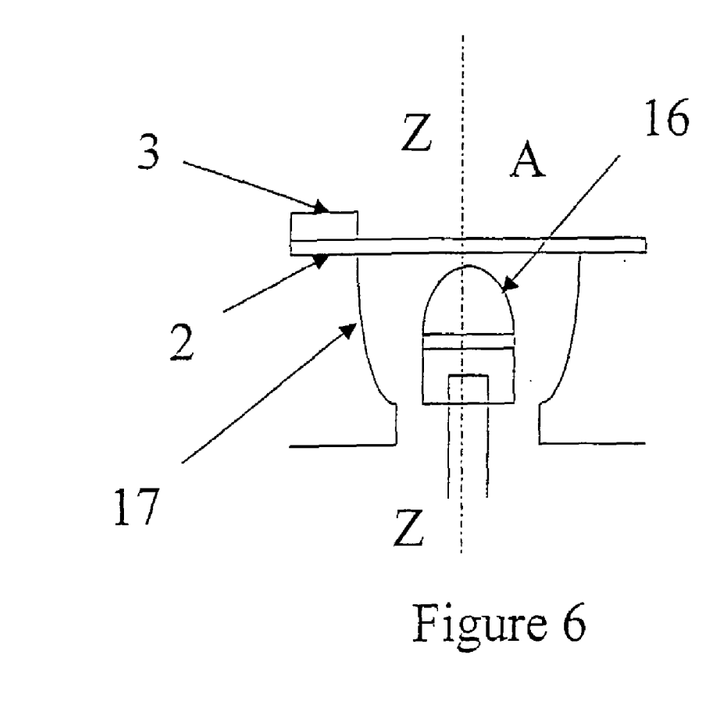
FIG. 6 is a side view of an LED, reflector, diffractive optical element, and mask arrangement.

FIG. 6 is a side view of an LED 16 positioned behind the diffractive optical element 2, and mask 3. The reflector 17 is designed to direct as much light that would otherwise be lost in a line generally parallel to the axis of the LED 16, which while illustrated to be the Z axis in FIG. 6 need not be that axis. However, this does not occur in all cases. In some instances the light is transmitted through the diffractive optical element and out at a wider angle to provide a wider field of useful viewing. In some of these cases the mask, having a black front as well as a black rear surface, serves to prevent the escape of this light by restricting the angle of the emitted light and light reflected off of the elements of an adjacent pixel.

Figure 7:
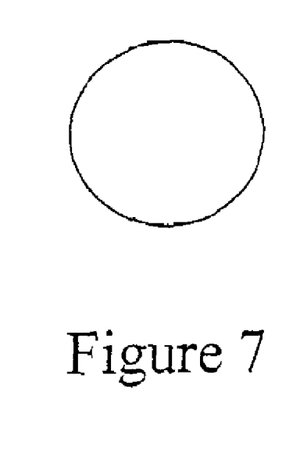
FIG. 7 is a cross sectional view of the divergent light emitted by an LED exhibiting a substantially circular form.
Figure 8:
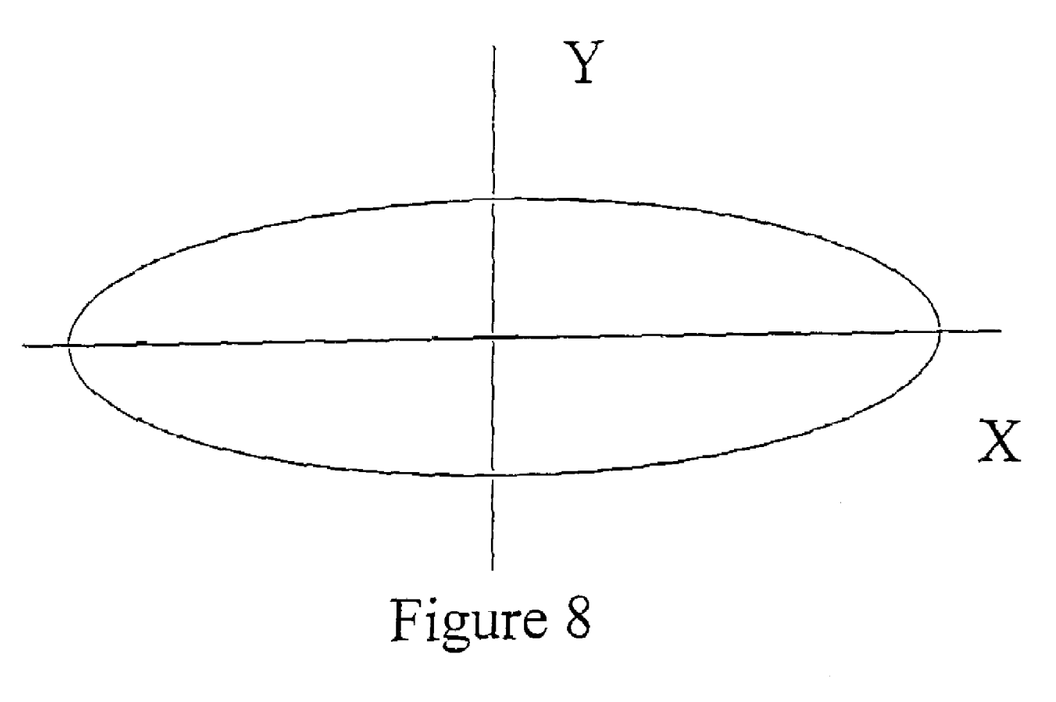
FIG. 8 is a cross sectional view of the divergent light emitted by the diffractive optical element exhibiting a substantially elliptical form.

One category of diffractive optical element that is available for use in this invention is the Light Shaping Diffusers® (diffuser) manufactured by Physical Optics Corporation® (POC). This diffuser is a surface relief hologram that diffuses the incident light differently in the vertical and horizontal directions. The incident light emitted from an LED in a pixel in the absence of a holographic element has a cross-section in the XY plane substantially of the form of a circle as in FIG. 7. The light emerging from the optical element has a cross-section exhibiting the general form of an ellipse as in FIG. 8. The pattern in FIG. 8 exhibits symmetry about the X axis and the Y axis. This is referred to as being substantially symmetrical about the X axis and the Y axis. In FIG. 8, the pattern displayed is substantially an ellipse. The light transmitted along the X axis being greater than the light transmitted along the Y axis.

For example, one POC diffuser produces a 95×35 degree angle pattern of transmitted light 95 degrees along the horizontal and 35 degrees along the vertical. This effect is enhanced due to the fact that the LED is emitting a light beam that has approximately a 16 degree overall spread and the reflector puts out light up to approximately at 45 degrees. While an LED such as a super oval may appear to exhibit the same characteristics, there are important differences.

Figure 9:
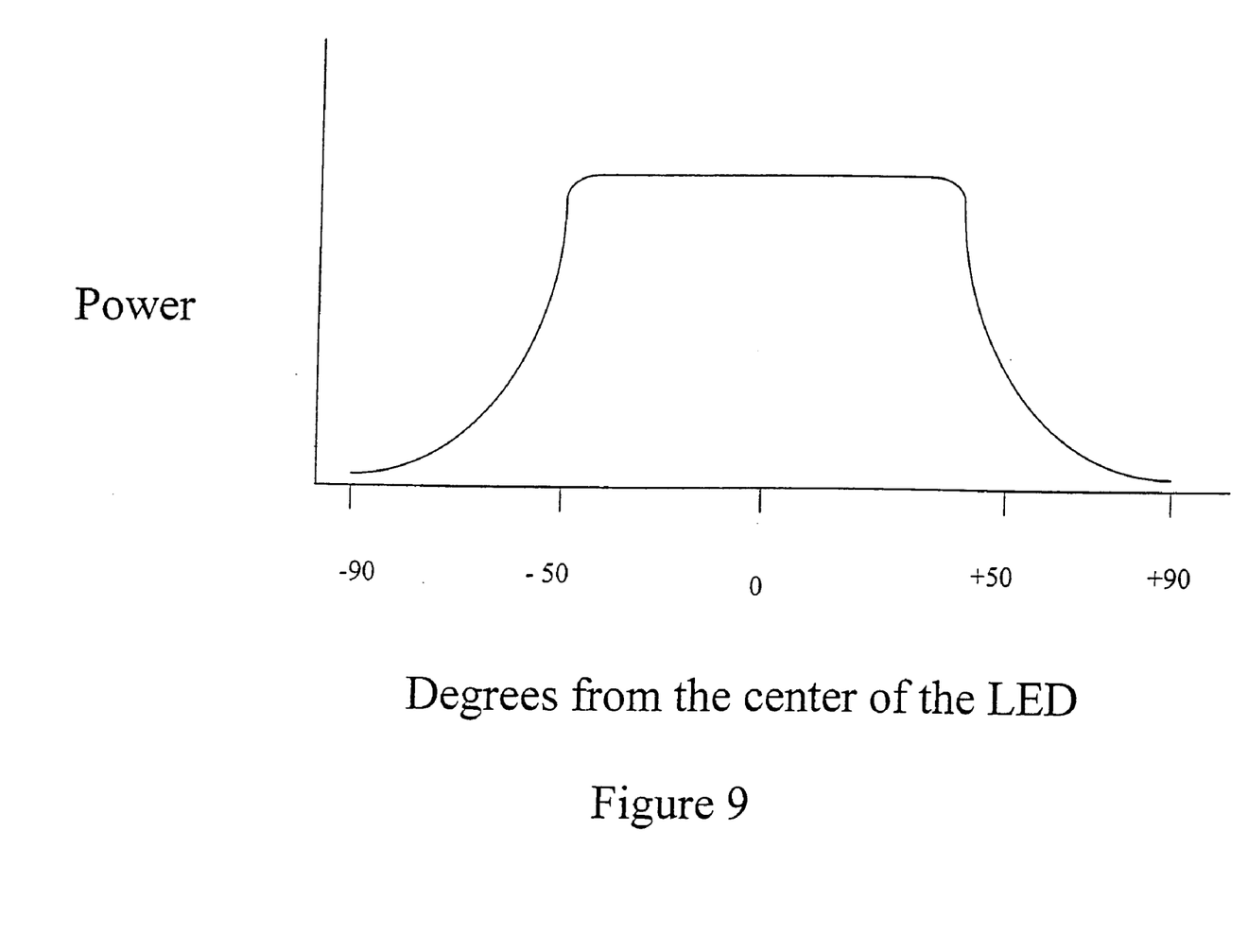
FIG. 9 is a graph indicative of the horizontal or x-axis power distribution from an LED having a divergent lens encapsulated within the LED.

FIG. 9 is an approximate graph of the power distribution of a super oval LED. At approximately 50 degrees from the center the power drops significantly. This means a viewer would experience a washed-out display if viewed much beyond the 50 degree point. It is readily apparent that there are significant power fluctuations between −50 and 50 degrees. This translates into a field of view that is not uniform for the viewer.

Figure 10:
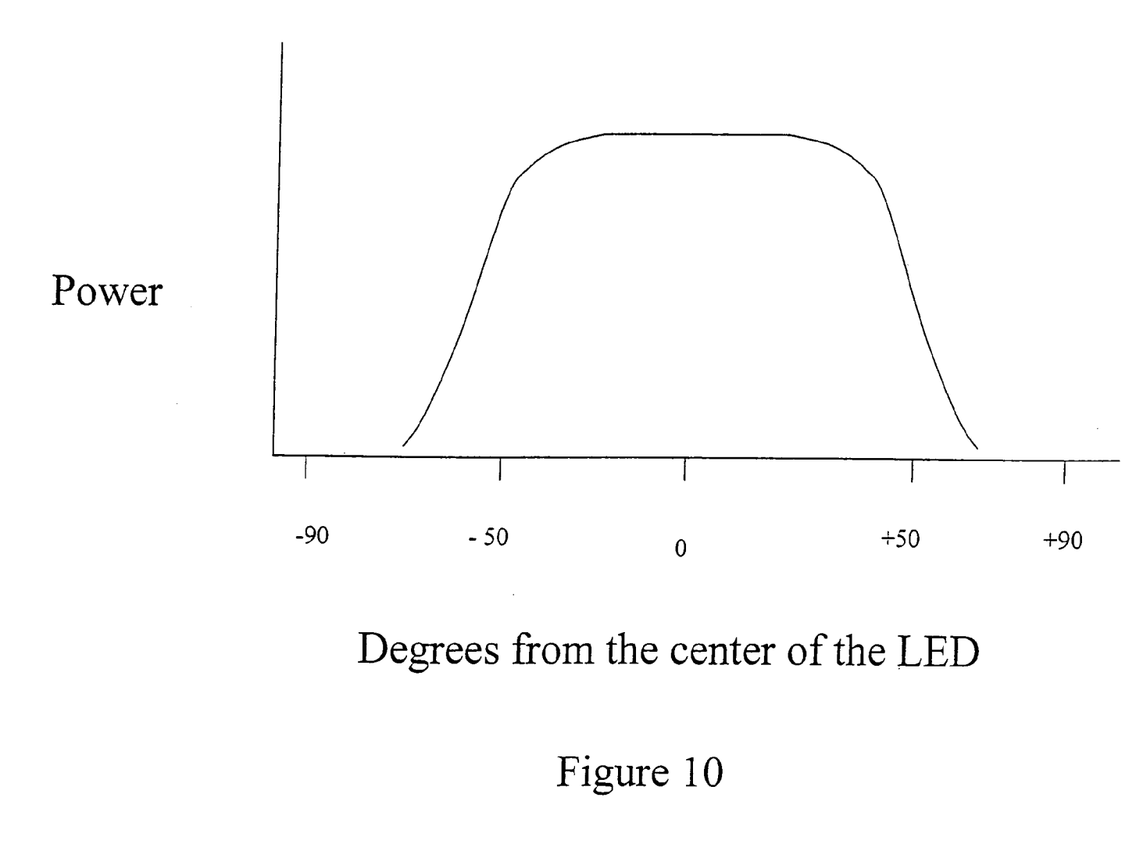
FIG. 10 is a graph indicative of the horizontal or x-axis power distribution from the divergent diffractive optical element with near collimated light.

FIG. 10 illustrates a graph of the power distribution of the POC diffuser when used with a collimated light. The graph indicates that the diffuser exhibits less power fluctuations over the same range as that of the super oval type LED. One reason for this uniformity is that the diameter of an equivalent effective element of the hologram is on the order of 10 microns. The incident LED light has a far larger diameter. As a result, numerous effective diffusers in the holographic optical element are used to average the overlapping transmitted light so an overall averaging of the transmitted beam is achieved. The larger number of equivalent optical elements produces a more homogenous divergent beam than a single element lens with many object variables.

While FIG. 10 indicates a power drop at 50 degrees, it is not as drastic a drop as for the super oval. Furthermore, this graph presumes a collimated incident light beam. The light from the LEDs in a pixel have about a 16 degree overall spread and includes light at even a greater angle as a result of LED light collected by the reflector. This spread tends to extend the limits of the graph of FIG. 10 to cover a larger angle. This results in an angle of view that goes beyond 50 degrees but still would drop off less drastically at the edges than an LED like a super oval.

One such type of LED used in this application is produced by Cree, Inc. The Cree LEDs are not designed to disperse light in a particular pattern as is the super oval LED. As a result, Cree LEDs are less complicated and cost less than specialty LEDs.

Another advantage of the holographic optical element is that it is not expensive. An LED having a 16 degree overall spread is less expensive than a super oval type LED. The combination of a number of 16 degree overall spread LEDs and a sheet of a holographic optical element is less expensive than the same number of super oval type LEDs. Thus, the video display apparatus can be constructed with more useful operating parameters at a lower price than corresponding super oval LED type apparatus.

The diffractive optical element has an advantage over a super oval type LED in the area of control over vertical dispersion. As mentioned previously, the LED lacks a certain amount of dispersion control in the vertical axis as the dispersion along the horizontal axis is varied. The holographic optical element has much greater control over this vertical dispersion. In fact, the control is nearly independent for each direction.

An important feature of the present invention is that the angle of dispersion can be chosen from a range of options, i.e. diffusion, reflection, prismatic, and others, to suit particular situations. An LED having an optical dispersing element built into it, such as a super oval LED, would not have the same flexibility and it becomes increasingly expensive to apply other varieties of dispersing elements into LEDs. Furthermore, the video display apparatus can allow for removing the diffractive diffuser optical element, diffuser, and replacing it with a different choice. The LED with the dispersing element built into it cannot allow for such a procedure.

Also, the present invention can utilize a diffractive optical element that will allow for a horizontal field of view from approximately −70 degrees to +70 degrees with minimal impact on viewability. This means that limits can be chosen within the ±70 degree range. The vertical field of view could range from approximately −50 degrees to +50 degrees, but in practice would be less. Again, the limits can be chosen within the ±50 range. An angle of ±50 degrees in the horizontal has proven to be an effective viewing range for large signs. The vertical viewing range can also be chosen so as to allow viewers, motorists, to view a billboard at optimum a limited range distances for a more efficient use of power output. Typically, the vertical range would extend from approximately ±7 degrees from the center to approximately ±25 degrees from the center.

It is to be noted that while the term "x axis" as used herein typically refers to an axis lying in a horizontal plane, as is illustrated in the drawings, it could be rotated 90°, if for example, the display was oriented vertically on a tall building. In such a case the x axis would be oriented in a horizontal plane.

Figure 11:
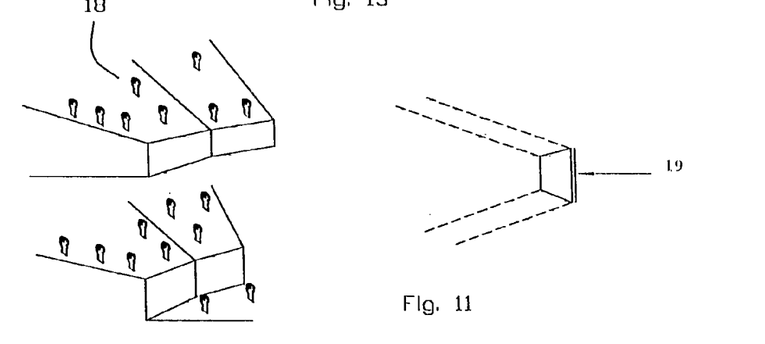
FIG. 11 is a side view of a stadium having seats and a display.

A viewer could see a display using video display apparatus at a greater angle. Apparatus can be combined to form signs that can be used in stadiums as in FIG. 11. The display 19 directs the light toward the viewers 18. It is important to note that the angle of view in the vertical plane is dispersed to cover only the approximate area where the audience resides.

Figure 12:
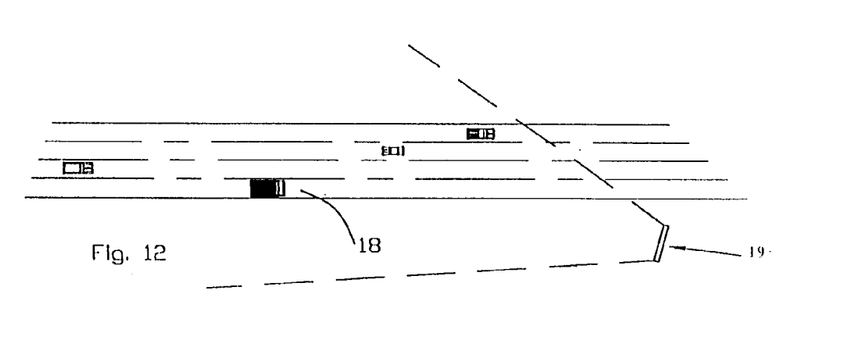
FIG. 12 is a top view of a motorist and display.

Another application would be the use of apparatus to create a display for billboards as in FIG. 12. The display 19 has an angular view in the horizontal plane that allows a viewer 18 in a car to view the billboard within a specific range from the billboard. This allows advertising while the viewer has a good view of the road.

Figure 13:
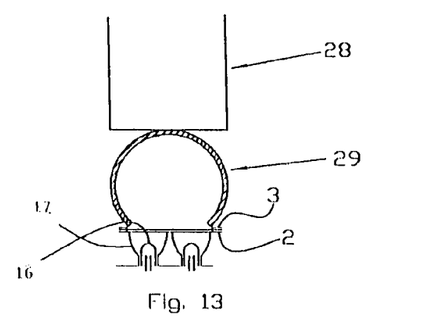
FIG. 13 is a side view of a pixel in the apparatus being calibrated.

FIG. 13 is illustrative of a setup for characterizing a video display apparatus such as that illustrated in FIGS. 1 through 5. Power is provided to a single LED 16 in pulses such that the LED does not visibly flicker. This is referred to as the predetermined operating time. A photometer 28 registers the intensity of the light. The integrating sphere of the photometer 29 is larger than the size for the pixel. This allows for receiving light from more than one LED when, for example, a pixel has two red LEDs that emit at the same time and also can receive light from each color LED in sequence.

Figure 14:
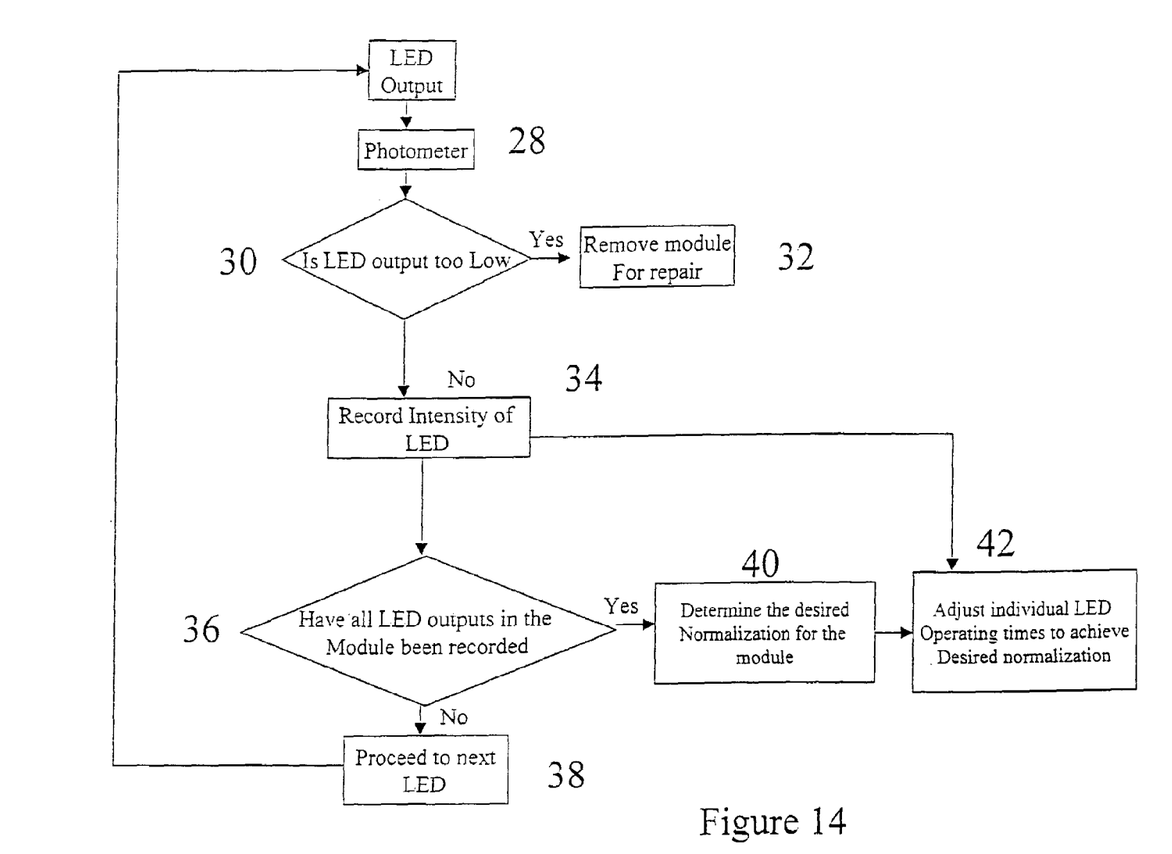
FIG. 14 is a flowchart illustrating the process for calibrating the apparatus.

In FIG. 14 the calibration process is illustrated. The data from the photometer 28 is analyzed to determine if the LED is operating below an acceptable level 30. If the LED is not operating at the minimum level, then the apparatus is removed for repair 32. If the LED is operating above a minimum threshold level, then the intensity level is recorded 34. If all the LEDs have not been recorded 36, then the process proceeds to the next LED 38.

When all the LED outputs have been recorded, then a determination is made as to the desired normalization level 40 for each color. The normalization level is the level at which the standard apparatus output is chosen. This is dependent upon numerous factors such as environmental application of the apparatus and customer specifications. Once the normalization for each color is determined, then each color LED in the apparatus is driven according to this normalized output 42. This is accomplished by varying the power pulses to each LED so as to change the intensity to a desired level. This is done by utilizing an algorithm to calculate the necessary power pulse to achieve a desired light output.

The change in the pulse time for each LED results in unique operating times for each LED to achieve a fairly uniform output for the apparatus. This is referred to as the operating time. This calibration technique reduces the risk that a single apparatus or single pixel is very much brighter or dimmer that others and helps to insure that the apparatus operates in conformance with customer specifications.

Calibration can also be accomplished by measuring the intensity and directly reducing the operating time until the intensity is at a normalized level. This measured operating time would then be utilized to drive the LED. This procedure would be repeated for each LED in the apparatus.

What is claimed is:

1. A video display apparatus for directing light forming a video image in an X, Y, Z coordinate system wherein the X and Y axis form the XY plane that contains the cross section of the dispersed light pattern, and the Z axis is in the direction of the propagation of light and is through the center of the light pattern in the XY plane, comprising:
   a. a housing;
   b. a plurality of pixels mounted in the housing for generation of pixels of light to make up the video image to be viewed by an observer or observers, each pixel representing the smallest increment of the image, each pixel comprising a plurality of light emitting diodes and each light emitting diode arranged to emit light outwardly from the housing; and
   c. a diffractive optical element mounted on the housing in front of each pixel, the diffractive optical element being arranged to receive the light emitted by the pixels and disperse the light in a substantially elliptical pattern directly to an observer(s) without using any light emitted modulating guide such that the dispersed light is centered along the Z axis and the pattern is greater along the X axis than along the Y axis.

2. The video display apparatus of claim 1 wherein the housing defines a planar surface, the LEDs being arranged substantially in a plane parallel to the housing surface with the Z axis being perpendicular to the housing surface.

3. The video display apparatus of claim 1 further comprising a mask, the mask securely fixed to the housing such that the diffractive optical element is between the housing and the mask, the mask surrounding the light emission area of each pixel to reduce reflected light.

4. The video display apparatus of claim 1 wherein the housing defines a substantially planer surface and wherein the diffractive optical element redirects the light incident from the LEDs such that the redirected light is at an angle which is at least 3 degrees greater than the incident light with respect to the Z axis.

5. The video display apparatus of claim 1 wherein the housing defines a substantially planar surface and further comprising a reflector for each light emitting diode for directing additional light in substantially an outward direction perpendicular to the surface of the housing.

6. The video display apparatus of claim 1 wherein each pixel has at least one light emitting diode for emitting green light, at least one light emitting diode for emitting blue light and at least one light emitting diode for emitting red light.

7. The video display apparatus of claim 1 wherein a plurality of video image modules can be combined to form a video image board.

8. The video display apparatus of claim 1 wherein the diffractive optical element is selected from the group having holographic, kinoform, binary multilayer and continuous (grey scale) faces which rely on diffraction to control the transmitted wavefront.

9. The video display apparatus of claim 1 wherein the diffractive optical element can be interchanged with other diffractive optical elements providing a variety of forms of transmitted light.

10. The video display apparatus of claim 1 wherein the diffractive optical element acts as a diffuser.

11. The video display apparatus of claim 1 wherein the diffractive optical element acts as a homogenizer.

12. The video display apparatus of claim 1 wherein the diffractive optical element is a surface relief holograph.

13. The video display apparatus of claim 1 wherein the diffractive optical element is a kinoform element.

14. The video display apparatus of claim 1 wherein the diffractive optical element is a binary element.

15. The video display apparatus of claim 1 wherein the diffractive optical element is a multilayer element.

16. The video display apparatus of claim 1 wherein the diffractive optical element is a continuous (grey scale) element.

17. A method for characterizing the light output of a video display apparatus having a plurality of pixels, each pixel comprising at least one LED for each color with each pixel representing the smallest increment of the image to be viewed by the observer and a diffractive optical element mounted in front of the pixels to disperse the light in a substantially elliptical pattern directly to an observer(s) without using any light emitted modulating guide comprising:
   a. supplying power at a selected level individually to the LED or LEDs for each color in each pixel; and
   b. measuring the intensity of the light generated by each LED or LEDs for each color in each pixel.

18. The method of claim 17 further including the step of controlling the power supplied to the LED or LEDs responsible for each color in each pixel to normalize the light output from the display apparatus.

19. The method of claim 18 wherein the step of supplying power to the individual LED or LEDs responsible for each color in each pixel comprises supplying current at a predetermined level for a selected time.

20. The method of claim 19 further including the step of controlling the time that current at said predetermined level is supplied to the LED or LEDs responsive for each color in each pixel to normalize the light out put from the display apparatus.

21. The method for characterizing the output of a video display apparatus by regulating the intensity of each color of claim 17 further comprising the steps of:
   a. determining if the intensity of any color specific LED or LEDs in any pixel is below an acceptable level; and
   b. removing the video display apparatus and replacing the unacceptable LED or LEDs when any color emitted is below an acceptable level.

22. A video display apparatus, the display to be viewed by one or more observers, comprising:
   a. a group of light emitting diodes making up individual pixels, each pixel emitting light in substantially an outward direction towards the observer(s); and
   b. a diffractive optical element adapted to receive the light emitted by each pixel and transmitting the light in a substantially elliptical pattern directly to an observer(s) without using any light emitted modulating guide.

23. The video display apparatus of claim 1 wherein the horizontal spread is between about plus 50 degrees and minus 50 degrees and the vertical spread is between about plus 7 degrees to plus 25 degrees and between about minus 7 degrees to minus 25 degrees.

* * * * *